Dec. 30, 1969     V. C. FARESE     3,486,381
SUPERSONIC-ENERGY MEASURING DEVICES AND SYSTEMS
Filed Oct. 25, 1966     6 Sheets-Sheet 1

INVENTOR
VITO C. FARESE
BY
John A. Harvey
ATTORNEY

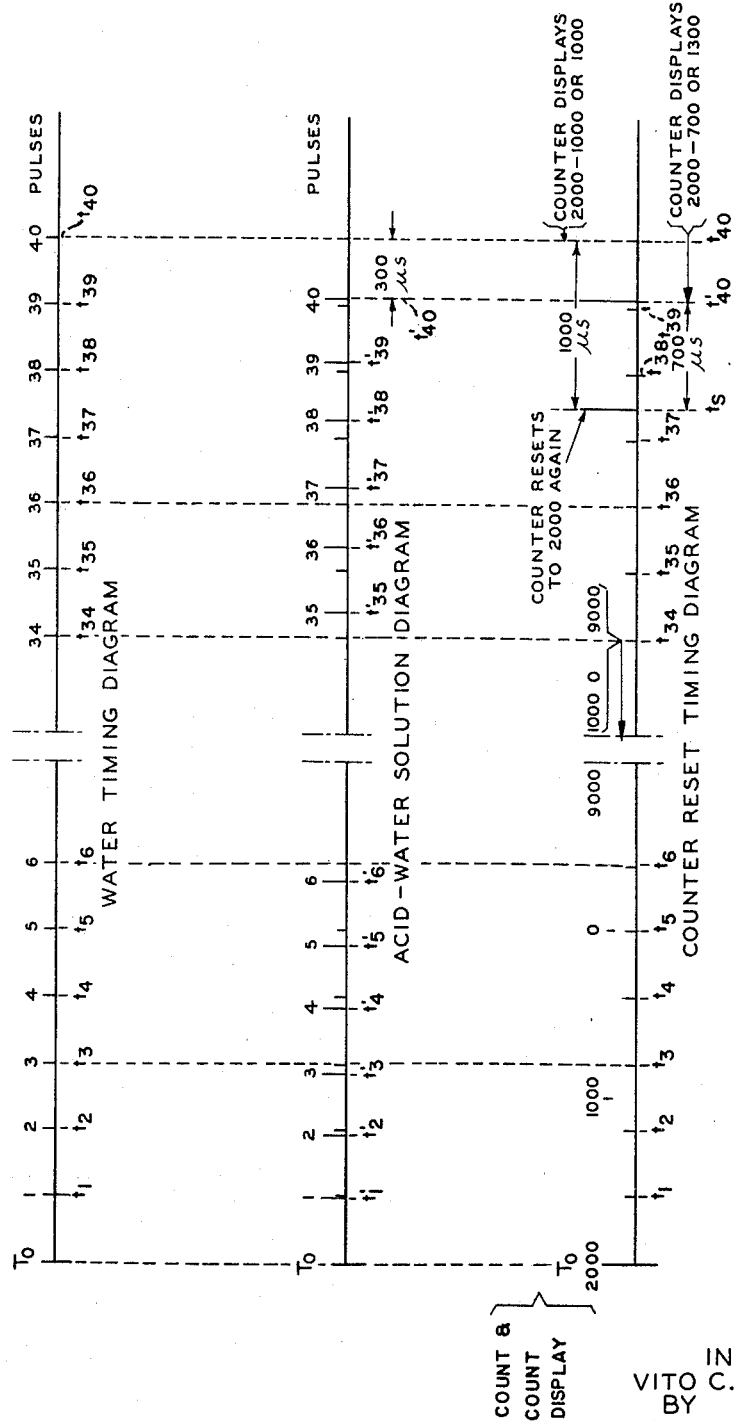

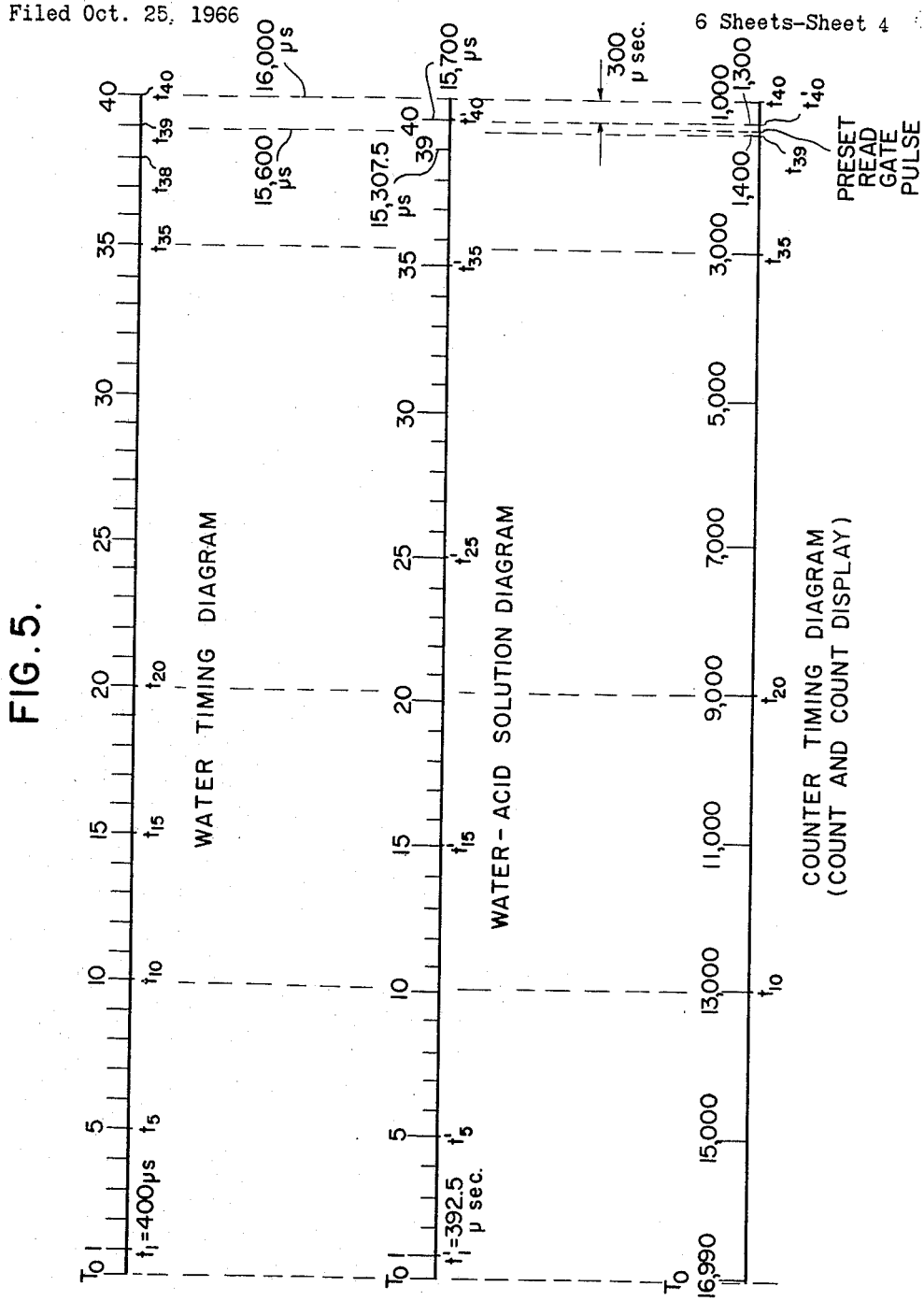

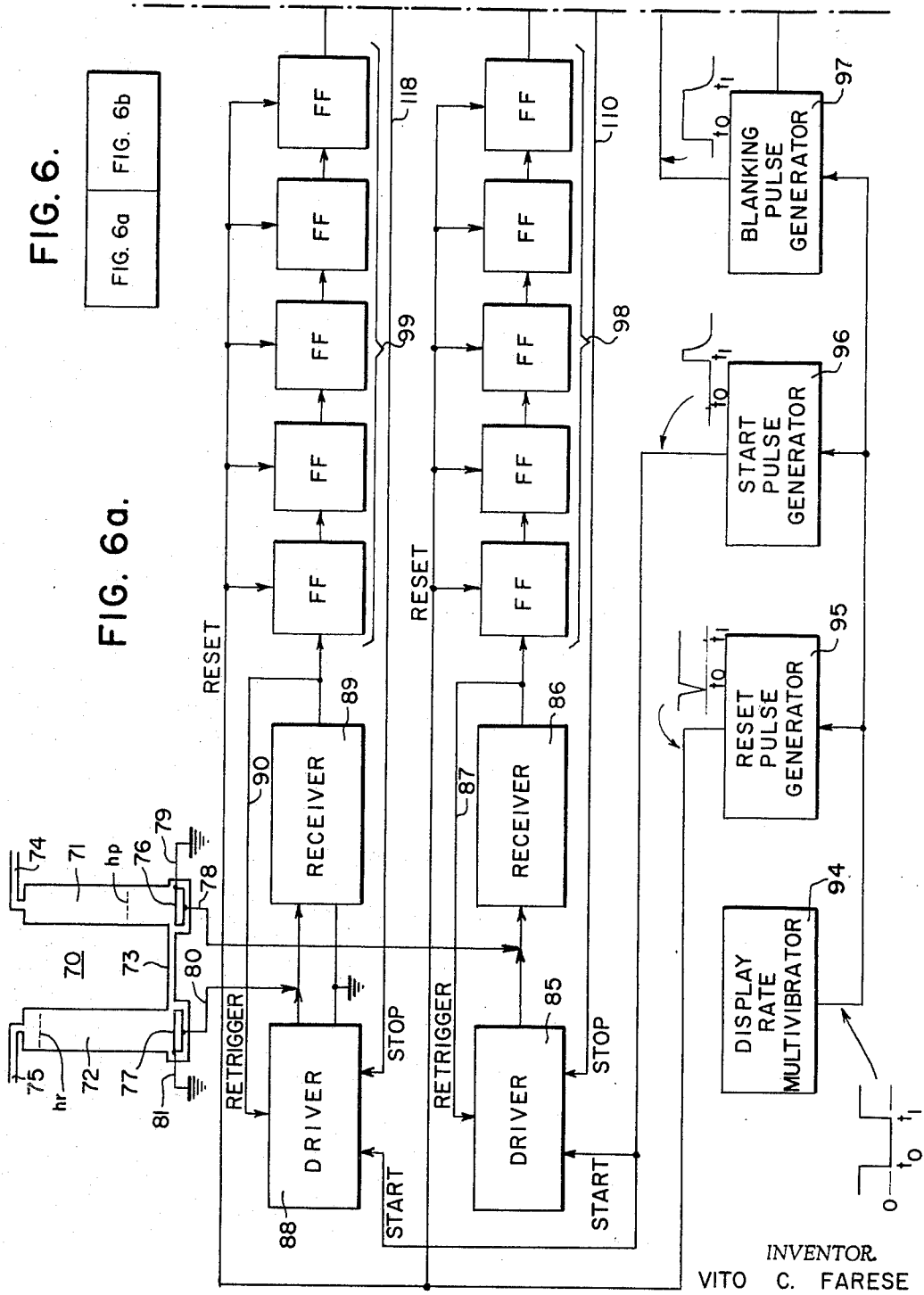

United States Patent Office 3,486,381
Patented Dec. 30, 1969

3,486,381
SUPERSONIC-ENERGY MEASURING DEVICES AND SYSTEMS
Vito C. Farese, St. Petersburg, Fla., assignor to Wallace & Tiernan Inc., East Orange, N.J., a corporation of Delaware
Continuation-in-part of application Ser. No. 317,087, Oct. 17, 1963. This application Oct. 25, 1966, Ser. No. 589,421
Int. Cl. G01l 7/18
U.S. Cl. 73—401
7 Claims

ABSTRACT OF THE DISCLOSURE

A supersonic transducer means transmits supersonic measurement pulses to a medium and receives supersonic echo pulses therefrom. This means is electrically energized by an energizing means to effect transmission by the transducer means of an initial supersonic measurement pulse and thereafter the transmission of a supersonic measurement pulse in response to reception of each of a succession of corresponding echo pulses. A first means controlled by the energizing means provides a standard-characterized reference time interval beginning with the initial measurement pulse and terminating at a time corresponding to the receipt of a preselected number of supersonic echo pulses in a standard-characteristic reference medium. A measuring means controlled by such first means initiates a time-measuring interval beginning at the termination of the standard-characteristic reference time interval and a second means controlled by the engizing means terminates the time-measuring-interval in response to receipt by the transducer means from the medium of a preselected number of supersonic echo pulses after transmission of the initial measuring pulse. A display means is responsive to the time measuring interval to display the value of a measured characteristic of the medium. A transducer means comprised by a single transducer which transmits measurement pulses through a fixed path length of the medium may measure and display the density of the medium to several significant figures, and one comprised by two transducers associated with individual arms of a manometer confining the medium may measure and display the differential height of columns of the medium in the manometer arms and thus provide a measurement of the differential pressures supplied to the latter.

---

The present invention relates to easuring devices and systems, and more particularly to devices and systems for measuring such characteristics as the density of a fluid, the specific gravity of a fluid, or the differential height of two fluid columns in the arms of a manometer.

The present application is a continuation-in-part of application Ser. No. 317,087, filed Oct. 17, 1963, now abandoned, for Ultrasonic Specific Gravity and Level Indicator, and assigned to the same assignee as the present application.

One application in which the present invention has important utility concerns a continuing and automatic measurement of the prevailing value and prevailing changes of value of the specific gravity of a fluid.

Heretofore it has been known that in order to measure the specific gravity of a fluid, a measuring device such as a hydrometer has been used. The attending limitations which occur through the use of the hydrometer are also well known to those skilled in the art. For example, it is quite time consuming to obtain a specific gravity reading when using a hydrometer and especially where a large number of batteries are to be checked. The tedious procedure of dipping the hydrometer into the solution to be tested, withdrawing the same from the solution and reading it on a graduated scale by use of the human eye, would have to be repeated for each battery to be checked. It is obvious that this would amount to a considerable length of time before all the readings could be accurately taken, and at best an inaccurate visual reading would result for all of the tested solutions.

Another serious drawback which is found when using the prior art device, that is a hydrometer, is that the fluid to be checked is generally of an acidic base and the operator is continually exposed to be acid as well as to the fumes emanating therefrom. The operator although exposed to these dangers, that is, contact with the acid within the liquid to be checked, still must make the necessary readings and in doing so must contend with the inaccuracies attending visual interpretation.

It is well known to those skilled in the art that the operator, while making readings, not only introduces the human errors, such as eye sight, but also the limitation of reading the level of a fluid through a glass tube is present.

It has become clear that the hydrometer is an inaccurate and oftentimes dangerous method of obtaining a correct evaluation of the specific gravity of a fluid.

A further field of utility of the present invention is in the continuing and automatic measurements of the differential heights of two fluid bodies, such as the prevailing values and prevailing changes of values of the differential heights of two fluid columns in the arms of a manometer. Manometers have long been used to measure the pressure of one glass in relation to that of another. A conventional manometer utilizes a U tube of glass arranged with its arms vertically oriented and partially filled with a suitable fluid. The most widely used fluid is mercury which, by reason of its large density value, minimizes the lengths of the manometer arms for a given value of gas pressure differential. The differential pressures of the gases measured cause the differential lengths of the fluid columns in the manometer arms to change. The difference of the resultant fluid column heights, as visually read from an appropriate scale or scales positioned adjacent the manometer arms, provides a measure of the differential gas pressures. The accuracy of visual readings of two fluid heights is dependent upon the visual acuity and skill of the observer in making the readings and is substantially impaired or even destroyed in the case of prevailing significant fluctuations of one or both of the gas pressures.

The prior manometer structures do not readily permit of automatic differential pressure measurements of high accuracy and suitable for display or utilization at a point more or less remote from the manometer. Such measurements are assuming increasingly greater importance in the present-day trend to automation of many petrochemical and the like processes where the measurement is required to be electrically provided in a form suitable for utilization in system control or for process computations. While it has been proposed that electrical contacts be provided in spaced relation along and extending through the glass walls of the manometer arms electrically to engage columns of mercury in the arms, and thus enable a form of electrical measurement to be obtained of the prevailing differential heights of the mercury columns, such construction does not provide the precision and accuracy of measurement required in many applications. To avoid certain of the limitations and disadvantages inherent in such structures, it has been proposed that a float of magnetic material be carried on the surface of the liquid column in a cistern-type of manometer and that a differential transformer be provided externally of the manometer column and be longitudinally movable therealong under control of a servo system automatically operable to maintain the transformer differential windings centered upon the prevailing position of the magnetic float. The resultant prevailing position of the differential transformer may then provide an analogue form of manometer reading. This proposed arrangement is not only more complex and expensive than desired, but for many applications is unduly limited in its speed of response and certain applications require additional structure and system complexity to enable conversion of its analogue reading to a digital read-out form suitable for automatic computer processing.

It is the general object of the present invention to avoid and overcome the foregoing and other difficulties of and objections to prior art practices by the provision of an electronic device for continually measuring the specific gravity of fluid with such accuracy heretofore unobtainable.

Another object of this invention is to continuously measure the specific gravity within a confined area.

Yet another object of this invention is to accurately measure the specific gravity within a confined area.

Still another object of this invention is to accurately measure the specific gravity of an acidic fluid without need for having the operator, who is taking such measurement, to be exposed to the acidic fluid.

Another object of this invention is to continuously measure the specific gravity of a fluid without disturbing the fluid, that is, without dipping an instrument therein each time a reading is to be taken.

A yet further object of the invention is to provide a novel system for measuring with high rapidity and a high degree of precision the prevailing value of differential level between two columns of fluid, either electrically conductive or nonconductive, confined within the arms of a manometer.

An additional object of the invention is to provide a new and improved manometer form of measurement system enabling an automatic and continuing visual display or digital type of electrical signal read-out, or both, of prevailing manometer responses to differential gas pressures of relatively steady-state or rapidly fluctuating values supplied to the manometer for measurement.

The aforesaid objects of the present invention in respect specific gravity measurements, and other objects which will become apparent as the description proceeds, are achieved by providing a housing means with a measured path disposed therein. A vertical wall, which defines one end of the measured path also houses a solid state transducer device. The solid state transducer device when pulsed sends an ultrasonic pulse down the measured path, the pulse rebounding from another wall back to the solid state device. Circuit means are connected to the solid state means for pulsing the solid state means, and means is provided for measuring the time of travel of the ultrasonic pulse. Further, there is provided a means for measuring the fluid level.

The objects of the invention in respect manometer measurements are achieved by providing a supersonic transducer at the bottom of each arm of the manometer, by pulsing both transducers initially with time coincident pulses, and by thereafter pulsing the transducers individually with retransmission pulses corresponding to echo pulses received by the individual transducer. The original and retransmission pulses are counted on an individual transducer basis, and a measurement interval is initiated when the pulse count of the transducer associated with the shorter manometer liquid column attains a preselected value and is terminated when the pulse count of the other transducer attains the same preselected value. The time duration of the measuring interval provides a highly precise measure of the differential heights of the liquid columns in the manometer arms, and is electrically ascertained for visual display or digital electrical signal read-out of the differential-height value measured.

For a better understanding of the present invention reference should be made to the accompanying drawings, where like numerals of reference indicate similar parts throughout the several views and wherein:

FIGURE 4 is a diagram of the several time and sequence pulse arrangements utilized with this form of the invention;

Figure 3:
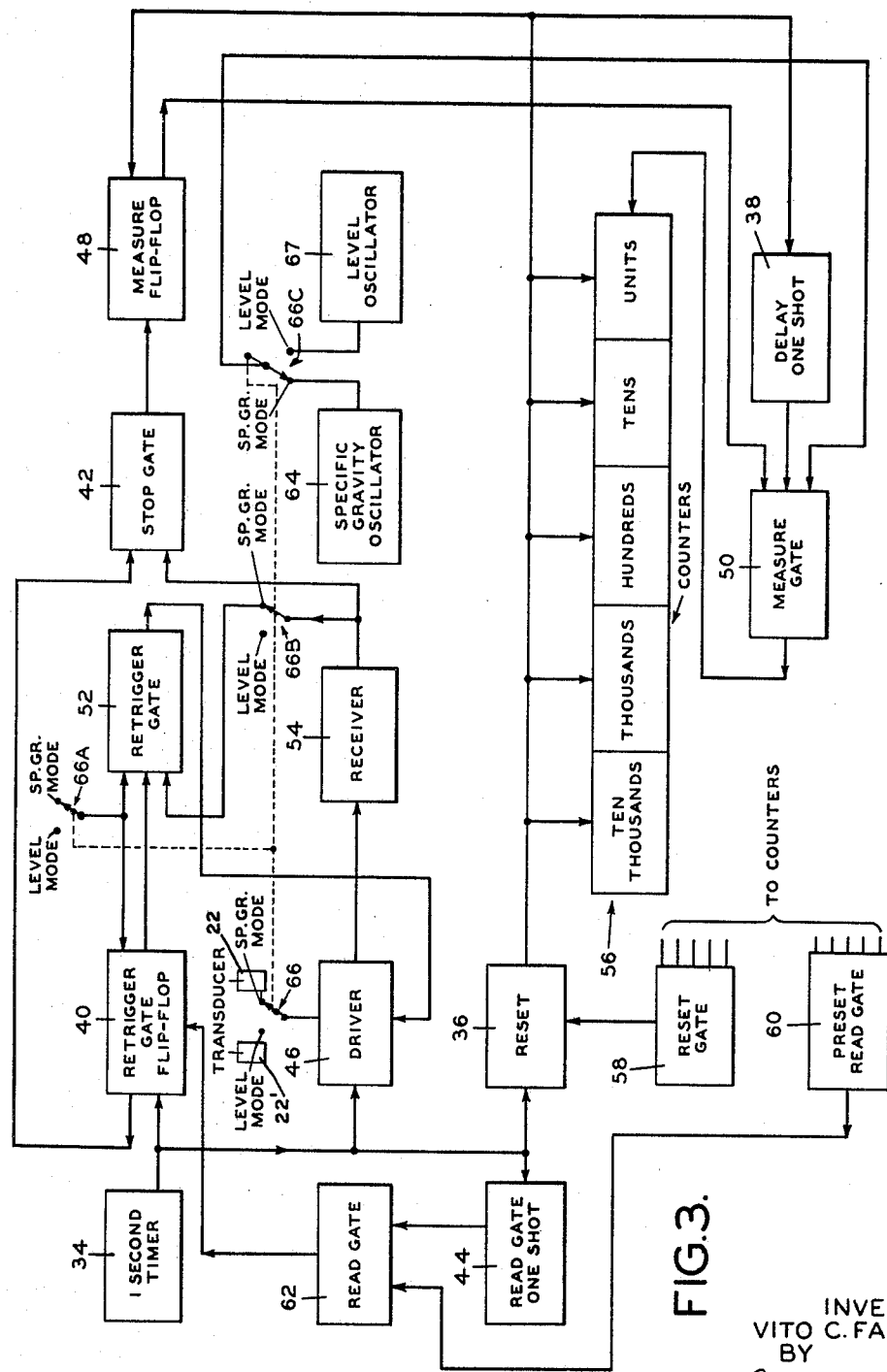
FIGURE 3 is a block diagram of the circuitry associated with a specific gravity measurement embodiment of the invention.
Figure 6B:
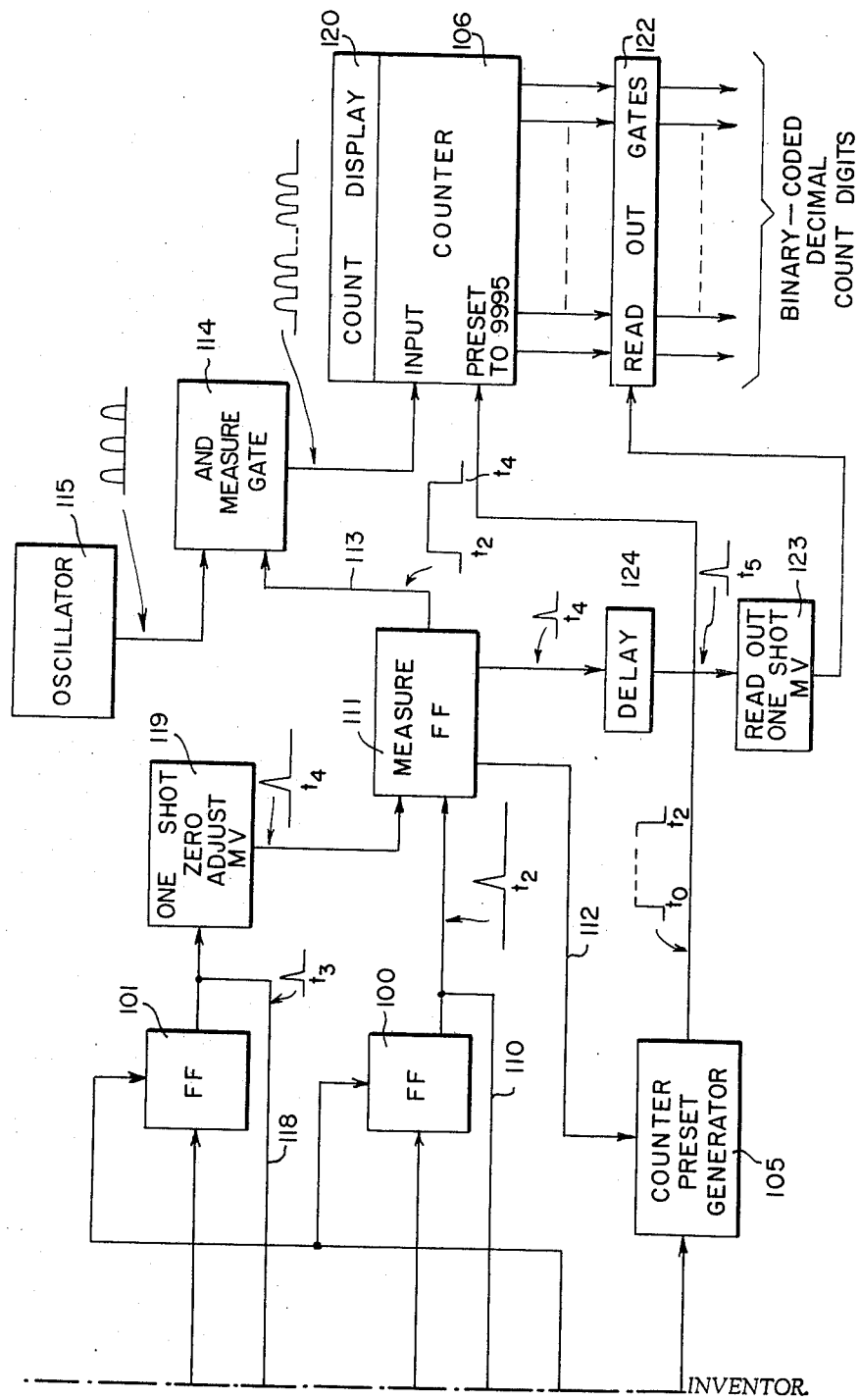

FIGURE 5 graphically represents the operation of a modified form of the FIGURE 3 embodiment of the invention; and FIGURES 6a and 6b arranged as in FIGURE 6 represent in block diagram the electrical circuit employed in a manometer measuring system embodying the present invention in a further modified form.

Figure 2:
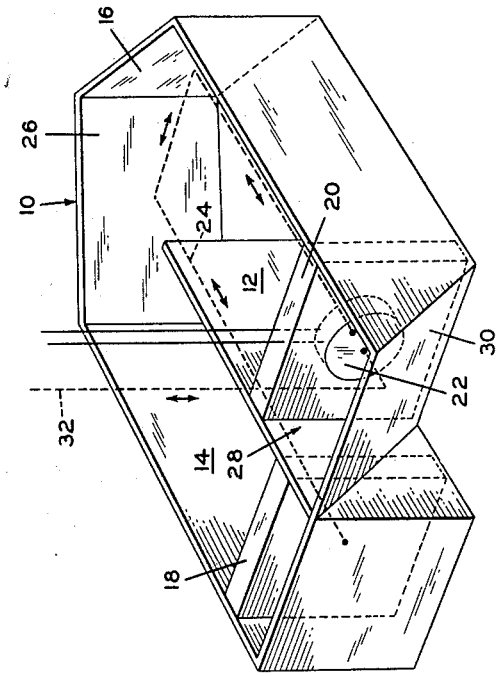
FIGURE 2 is a perspective view of the housing.

With reference to the specific gravity measurement form of the present invention illustrated in the drawings, and referring particularly to FIGURE 2, a housing is indicated by the reference numeral 10.

Structurally, the housing 10 is divided into two sections 12 and 14. The end wall 16 of section 12 is disposed at a 45° angle relative to the section 12, and the end wall 26 of section 14 is disposed at a 45° angle relative to section 14. Although the housing 10 is herein shown as a two section housing, it may be constructed with only one section. The other end wall 18 of section 14 is a vertical wall whereas section 12 is provided with a vertical wall 20 which also houses a solid state device such as a transducer 22. The dotted line 24 indicates the path of a pulse emanating from the transducer 22. Following the path generally indicated by reference numeral 24, a pulse emanating from the transducer 22 travels down section 12 and strikes the end wall 16, bounces from wall 16 to wall 26, rebounds from the 45° angle wall 26 to strike vertical end wall 18 of section 14, and thereafter bounces from the end wall 18 of section 14 to the other end wall 26 and thereby retraverses the path indicated by the dotted line 24. In this manner a pulse may travel to and from the transducer 22 in this manner just described.

Figure 1:
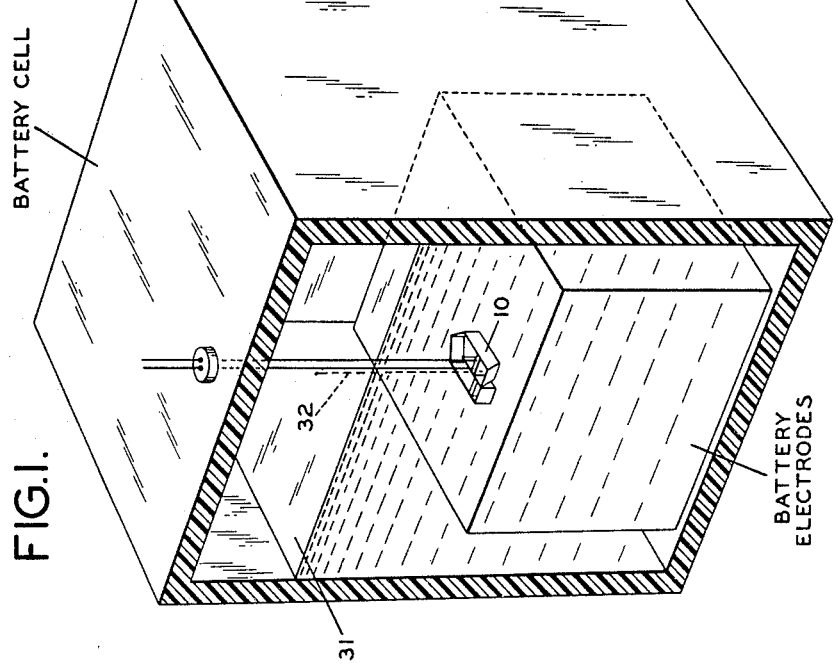
FIGURE 1 is a partially cut away perspective view of the container housing.

On the opposite side of the vertical wall 20, which houses transducer 22, is yet another section 28. Section 28 further includes an inclined end wall 30 so that a pulse emanating from the transducer 22 will strike the inclined wall 30 and bounce vertically from that wall 30 to strike an interface 31 of fluid and air and thereafter rebound from the interface 31 (FIGURE 1) to the inclined wall 30 and back to the transducer 22. In this manner a signal or pulse generated by the transducer 22 may traverse the path generally indicated by the dotted line 32.

In order to accurately display specific gravity information utilizing ultrasonic pulses in a confined area such as a battery cell, it is necessary to measure the accumulated displacement of a series of re-echoed or rebounded pulses traversing an accurately measured path. The path generally indicated by reference numeral 24 represents such an accurately measured path, the displacement hereinabove mentioned being the result of the difference between the velocity of an ultrasonic pulse passing through water and that of a pulse traversing the same path in an acid-water solution. Therefore, a water solution may be used as a standard against which an acid-water solution is measured, that is, the pulse traversing a measured path in water will take a certain amount of time to make such a trip whereas a pulse traveling the same measured path in an acid-water solution will take another length of time to traverse the same path, either faster or slower depending upon the specific gravity of the solution in which the pulse is traveling. This time difference is the quantity that is directly determined as a measure of the solution specific gravity.

Measuring the time it takes for a pulse to make one traversal of a small measured path would be of limited accuracy, however, should the pulse be echoed back and forth a predetermined number of times, the path length would be much larger in accordance with the number of times the pulse was re-echoed and therefore the measured difference would be more accurately premised upon a larger time base than would be the case had recycling not taken place.

FIGURE 3 represents a block diagram of the circuitry involved in accurately measuring the time it takes for the ultrasonic pulse to traverse the measured path as indicated on FIGURE 2 by reference numeral 24. It should be noted at this point that the traversed path 24 indicates the path that the pulse traveled to obtain a specific gravity reading whereas the path 32 represents the path traversed by the pulse in obtaining liquid level measurement. Inspection of FIGURE 3 indicates that there are two modes in which this apparatus may operate; that is the specific gravity mode and the liquid level mode. FIGURE 3 is shown in the specific gravity mode, switches 66, 66A, 66B and 66C being so positioned.

In order to visually display the reading obtained by the operation of this device, a set of counters 56 are provided so that the reading may be numerically displayed to the viewer. The previously mentioned switches 66, 66A, 66B, and 66C represent the mode switch which may comprise four switches ganged together, thereby being controlled by one switching action, or they may be separate switches whichever is more desirable. For the purpose of setting the counters 56 to the proper starting number, which in this case is 2000 for reasons presently to be explained, a reset 36 is provided. Such a reset device is well known in the art and in and of itself is not claimed as inventive. Further, it is to be noted that the figure 2000 is an arbitrary number and that any starting reference numeral may be used.

A delay one shot 38, which may be a one shot multivibrator, introduces a 10 microsecond delay which allows the counters to recover from their previously set positions and has a one-shot operating cycle initiated by the reset 36 each time the counters 56 are set by the latter. It is generally known that these counters take from 5 to 6 microseconds to recover and this delay one shot 38 allows a sufficient amount of recovery time for the counters.

The one second timer 34, which is a pulse device generating start potential pulses at one second start intervals, is of a circuitry well known to those skilled in the art. This one second timer 34 actually initiates the pulse which starts the circuitry in operation for each of successive measuring intervals. For example, it drives the reset 36 to reset the counter to the starting number 2000 as previously explained and through reset 36 drives the delay one shot 38 which allows the counters to recover as also previously described; also, the timer 34 sets the retrigger gate flip-flop 40 which is a bistable multivibrator or similar circuitry, as well as setting through the reset 36 the measure flip-flop 48 to allow a measure gate 50 to be enabled. At the same time the timer pulse activates the driver 46, which is connected to the transducer 22, thereby allowing an exciting pulse to impinge upon the transducer 22. A read gate 62 is connected to and controlled by a preset read gate 60. The reset gate 58 is controlled by the count of the counters 56 as identified by the plural leads labeled "TO COUNTERS" and like the timer 34 controls the reset 36 to reset the counters 56 to the starting count of 2000. The preset read gate 60 is likewise controlled by the count of the counter stages of the counter 56 to provide a pulse for the read gate 62 which, when enabled by the read gate one shot 44 near the end of the measuring interval as hereinafter explained, changes the state of the retrigger gate flip-flop 40 for reasons presently to be explained. A receiver 54, which is connected to the driver 46 and operatively associated with the transducer 22, is a conventional amplifier and is well known to those skilled in the art. A specific gravity oscillator 64 or the level oscillator 67 is utilized to pulse the counters 56, through measuring gate 50, for their timing and displaying operation. These oscillators are very accurately controlled crysta oscillators and are of the conventional type used for generation of pulses derived from oscillations of very accurate frequencies and they are well known to those skilled in the art.

In order to display specific gravity information using supersonic measurements in a solution in a confined area such as a battery cell (see FIGURE 1) the present system measures the accumulated displacements of a series of retriggered pulses traversing an accurately measured path such as the path 24 shown in FIGURE 2. In order to obtain a larger measurement time base, the initial pulse by retriggering is effectively echoed back and forth many times. The relative pulse displacement mentioned above is the result of the difference in known velocity of sound passing through water and the measured velocity in a water-acid solution. Therefore when the echo of the first pulse triggers the second in a manner presently to be described, the small displacement occasioned by one traversal of a pulse over the fixed-length path will in effect be multiplied by the number of times retriggering of the echo occurs. Assuming that a reading by the counter 56 of 1.000 is required for water and 1.300 is required for a fully charged battery acid solution, if the fourth figure is to be significant it becomes apparent that the accumulated (re-echoed) displacement must be large enough to measure the difference of 300. If the maximum counting rate of the counters 56 is one megacycle, the multiplied time differential is of necessity a minimum of 300 microseconds. The time from pulse transmission to reception of the return echo pulse is made greater than the 300 microseconds required for the difference information so as to facilitate identification of the terminal measuring echo pulse whether received in water or acid. Assume that 40 echoes are required for a particular measured path in order to effect the necessary 300 microsecond difference as between water and water-acid solution. At time t0 (as seen in FIGURE 4) an initial pulse is transmitted; in traveling through water it is returned and retriggers a second pulse at time $t_1$, as indicated on the water timing diagram, which is transmitted and returned to retrigger a third pulse at time $t_2$ and so on. In this manner we may use the single initial pulse to be echoed back and forth as previously stated, (40 times or 40 echoes) thus extending the measurement time base from the travel time from $T_0$ to $t_1$ of one pulse out and back, to a travel time of $T_0$ to $t_{40}$ for 40 pulses out and back. As indicated by the acid-water solution diagram of FIGURE 4, the travel time from $T_0$ to $t'_1$ of the initial pulse out and back in an acid solution is slightly less than in water so that the travel time from $T_0$ to $t'_{40}$ of 40 pulses out and back is correspondingly shorter by the 300 microsecond value, shown at the right of the acid-water solution diagram and mentioned above, than in the case of water.

Although it is believed that the operation of the apparatus will be apparent from the foregoing description, a brief review of such operation will now be made for purposes of summary simplification. Particularly, the one second timer 34 intiates each measuring interval with a start pulse. The start pulse emanating from the one second timer 34 drives the reset 36 which sets the counters 56 to an initial count of 2000 as indicated on the counter reset timing diagram of FIGURE 4, which also shows that the counters are arranged to count downward for reasons appearing hereinafter. Simultaneously the start pulse acting through the reset 36 starts the delay one shot 38 which is used to make sure that the counters have recovered from the reset prior to counting again and which introduces a ten microsecond delay after the reset. From 34 to the start pulse also sets the retrigger gate flip-flop 40 to enable the retrigger gate 52 and also disable the stop gate 42. The retrigger gate 52 and the stop gate 42 are conventional gating circuits well known to those skilled in the art. Similarly, the start pulse emanating from the one second timer 34 starts the read gate one shot 44 and simultaneously activates the driver 46 which transmits an excitation pulse to the transducer 22. The start pulse acting through the reset 36 also triggers the measure flip-flop 48, which is connected to the measure gate 50 and also is controlled by the stop gate 42, to enable the measure gate 50. The pulsed transducer 22 sends out its ultrasonic pulse along the measured path 24 and the pulse is re-echoed back to the transducer 22 and this re-echoed pulse is then amplified in the receiver 54.

The reflected or echoed pulse which has been received and amplified by the receiver 54 is then passed to the previously enabled retrigger gate 52. Since the retrigger gate 52 is in the enabled state, as previously stated, the amplified received echo pulse passes through the retrigger gate 52 and this pulse once again retriggers the driver 46 to once again pulse the transducer 22. This retrigger cycling effect continues until the retrigger flip-flop 40 disables the retrigger gate 52 and also enables the stop gate 42. The read gate one shot 44, which is set by the start pulse and maintains the read gate 62 disabled until a terminal portion of the measuring interval conveniently having about a 3000 microsecond duration, prevents the retrigger gate flip-flop 40 from changing state after the start pulse and does this by not allowing any signal from the preset read gate 60 to pass through the read gate 62 until the 3000 microsecond duration terminal portion of the measuring interval provided by the read gate one shot 44 has been reached.

As previously assumed, if the pulse initiated through the solution were to be echoed 40 times and the containers were to read 1,000 or 1.000 on the fortieth pulse when the counters 56 while counting at a counting rate of one megacycle reached the predetermined count of 1000, the elapsed time as shown by the time scale of the counter reset timing diagram of FIGURE 4 would total 40 times 400 microseconds or 16,000 microseconds. As shown by the counter reset timing diagram of FIGURE 4, the counters count down starting from an initial count of 2000 at time $T_0$ and upon reaching a zero count (at time $t_5$ corresponding to the fifth pulse in water) start again from a full count indicated at 10,000. Each time the counters reach an intermediate count of the reset gate 58, as described in more detail below, the reset gate 58 passes a pulse signal which drives the reset 36 and the delay one shot 38 to reset the counters to the initial 2000 count value thus effectively reducing the full count capacity of the counters by the difference between the intermediate and reset count value. The reset gate 58 is advanced 10 microseconds to allow for the delay one shot 38. The counters 56 then reset and begin counting immediately after the delay one shot 38 time delay has been introduced, which is the 10 microseconds.

To allow for the terminal counter reset at time $t_s$ 1000 microseconds prior to the time $t_{40}$ of the 40th pulse in water, as shown at the right-hand end of the counter reset timing diagram in FIGURE 4, the elapsed time is the 16,000 microseconds overall measuring interval earlier mentioned minus 1000 microseconds or 15,000 microseconds. If X be considered the number of counts performed by the counters 56 between the full count and the intermediate reset count established by the reset gate 58 (including the previously mentioned advance of 10 counts to take into account the 10 microsecond non-counting recovery interval of the delay one shot 38), the total count of the counters 56 in the 15,000 microsecond interval last mentioned is made up of: (1) 2000 counts in the interval from $T_0$ to $t_5$, (2) X counts in the interval from $t_5$ to resumed counting after the first reset which occurs near the center of the measuring interval, (3) 2000 counts immediately following resumed counting after the first reset and terminating at the time counters count to zero and start once more from the full count, and (4) X counts from the full count state of the counters to resumed counting at time $t_s$ after the second reset. Thus 15,000 microseconds is equal to 2000+X+2000+X, from which it is evident that X has the value 5500. The counters at the time of reset have a count of 10,000−5500+10 (the earlier mentioned 10 microsecond advance of the reset gate 58) or 4510, and it is at this count value that the reset gate 58 for the second time causes the reset 36 to reset the counters 56 to the count value 2000 and resumed counting to start 10 microseconds after reset as earlier described.

As the counter 56 progresses through its several count cycles starting with a count of 2000 at time $T_0$ and progressing to the same count at time $t_s$, the preset read gate 60 passes a pulse signal to the read gate 62 each time the count of the counter 56 corresponds to the present count of the preset read gate. These pulse signals have no effect on the read gate 62, since the latter is not enabled by the read gate one shot 44, until the terminal 3000 microsecond portion of the measuring interval as earlier explained. However, after the read gate one shot 44 has completed its cycle and enabled the read gate 62 as explained above, the preset count of the preset read gate 60 is again reached. This occurs at a count which follows the arrival at time $t_{39}$ of the 39th echo in water but which precedes the count at the arrival time $t'_{40}$ of the 40th echo in acid. When this preset count is reached, the preset read gate pulse passes through the enabled read gate 62 to change the state of the retrigger gate flip-flop 40 which now disables the retrigger gate 52 and enables the stop gate 42. The next amplified echo from the receiver 54 now passes through the stop gate 42 to the measure flip-flop 48 to change the state of the latter and thereby disable the measure gate 50. This blocks the timing pulses from the specific gravity oscillator 64 from reaching the counters 56 after the counter has arrived at the correct display. As previously stated this specific gravity oscillator 64 is utilized by the counters 56 for the timing and count display of specific gravity measurements.

The counters 56 are utilized for obtaining a precision gating delay or predetermined elapsed time interval, established in cooperation with the preset read gate 60, and also as an accurate specific gravity readout. Thus in summary of the foregoing and by way of illustration of a representative application, the counters 56 may be initially set at two thousand and thereafter count for a predetermined minimum length of time, which includes both (a) an intermediate reset and (b) a time $t_s$ terminal reset to two thousand by the reset gate 58. The read gate 62 by control of the retrigger gate flip-flop 40 allows 39 echoes to retrigger the driver 46 and permits the 40th echo to stop the counters. The reset gate 58 sets the counters to 2000 at time $t_s$ such that in a water solution 1000 counts will be read just prior to the 40th echo. Since the velocity of sound in water is slower than in water-acid, it is necessary that the counters count downward so that their indicators run in reverse. Therefore, the counters will display 1000 (2000−1000) for a water indication as indicated on the counter reset timing diagram of FIGURE 4. If a water-acid solution (1.300) is used the 40th echo will be 300 μsec. closer to $T_0$ due to the increased pulse velocity. Therefore, when the counter is set to 2000 at time $t_s$ by the reset gate 58, instead of 1000 being read as in the previous case the counter will read 2000−700 or 1300 as also indicated by the counter reset timing diagram of FIGURE 4.

In the level mode the switch 66 is flipped from the specific gravity mode to select the level mode transducer 22' and transfer the switch contacts 66A, 66B and 66C, to the level mode thereby effectively suppressing the retrigger gate 52 and retrigger flip-flop 40 and permitting the stop gate 42 to remain enabled while selecting the level oscillator 67. The one second timer 34 drives the reset 36 setting the counters 56 to read 2000 as before. The one second timer 34 also through the reset 36 drives the measure flip-flop 48 to enable the measure gate 50 and drives the delay one shot 38 to introduce the 10 microsecond delay. The one second timer 34 simultaneously triggers the driver 46 to transmit a pulse through the transducer 22' connected by the switch 66 to the driver 46 and mounted on the level-measuring-path side of the wall 20 of FIGURE 2, which bounces a signal off the inclined wall 30 of the housing 10 and impinging on the interface 31 between the solution and the atmosphere above the solution. The pulse echoed from the interface is echoed back to the transducer 22'; this pulse is thereafter amplified by the receiver 54 and thereafter sent to the stop gate 42. The echo pulse passing through the stop gate 42 drives the measure flip-flop 48 and disables the measure gate 50 stopping the counters 56. The counter displays the number of pulses from the level oscillator 67 read during the transmit to receive time of the pulse emanating from the transducer 22' to the interface 31, the display as before being the difference between the initial and final settings of the counter, thus accurately displaying the time of travel of the transducer pulse.

In a slightly modified form of the specific gravity measuring system described above, the counter 56 is initially reset by the reset 36 at time $T_0$ to a five digit count of 16,990 which corresponds to a count of 17,000 minus 10 counts corresponding to the non-count 10 microsecond interval provided by the delay one shot 38 in the manner previously explained. As in the system operation heretofore described in relation to FIGURE 3, the counter 56 after time $T_0$ begins to count downward after elapse of the 10 microsecond count delay interval provided by the delay one shot 38. The reset gate 58 and the read gate one shot 44 are not used in this modified form of system since counter 56 is not again reset during its count-down operation, and by reason of this the read gate 62 may also be omitted since the output pulse signal of the preset read gate 60 (which pulse signal occurs as previously explained between the 39th echo in water and the 40th echo in acid) may be applied directly to the retrigger gate flip-flop 40 to change its state as before. It will be evident that the counter during its progressive countdown, under control of the timing pulses supplied from the specific gravity oscillator 64 through the enabled measure gate 50, attains the count values indicated for the counter timing diagram graphically shown in FIGURE 5 in relation to the water and water-acid solution timing diagrams also shown in this figure. It may be noted that the water and water-acid solution diagrams of FIGURE 5 correspond exactly to those of FIGURE 4, while the terminal portion of the counter timing diagram of FIGURE 5 coincides with the portion of the counter timing diagram of FIGURE 4 after the counter has reset to 2000 at the time $t_s$. Thus for a water solution the counter as indicated in FIGURE 5 likewise attains a count value of 1000 corresponding to the 40th pulse in water and for an acid-water solution of 1300 specific gravity attains a count value of 1300 corresponding to the 40th pulse in an acid-water solution of this specific gravity. The operation of this modified form of the invention is otherwise that previously described in relation to FIGURE 3 and will not be repeated.

A further modified form of the invention particularly useful in a manometer form of measurement system is shown in block diagram form in FIGURES 6a and 6b arranged as in FIGURE 6. A manometer 70 which may have any well known construction includes hollow vertically-oriented manometer arms 71 and 72 formed of glass or metal tubing according to the gas pressures to be measured. The manometer arms confine a suitable manometer fluid, such as mercury, and have an interconnecting duct 73 connecting their lower ends for interchange of the manometer fluid between the arms. The arms 71 and 72 have respective input gas pressure ducts 74 and 75 at their upper ends and through which individual gas pressures may be supplied to the manometer for measurement of a prevailing differential gas pressure. A transducer 76 is positioned at the lower end of the manometer arm 71 for transmission of supersonic measurement pulses to the manometer fluid in this arm and for reception of corresponding supersonic echo pulses therefrom. A transducer 77 is similarly positioned for the same purpose at the lower end of the manometer arm 72. These transducers may conveniently be of piezoelectric ceramic material, such as barium titanate, and preferably may be of the lead zirconate-titante ceramic disc type having deposited metal films on their opposing faces of each to provide electrically conductive electrodes to which electrical conductors 78–81 are affixed and extend in electrically insulated relation to the manometer structure to the exterior thereof as shown.

As in the measuring system first described above, the present manometer form of measurement system includes a driver 85 and a receiver 86 coupled to the transducer 76 to supply electrical supersonic measurement pulses thereto and to receive electrical supersonic echo pulses therefrom. A retrigger circuit 87 conventionally couples the amplifier echo-pulse output circuit of the receiver 86 to a retrigger input circuit of the driver 85 to cause the latter to supply a supersonic measurement pulse to the transducer 76 each time the latter receives a supersonic echo pulse. A similar driver 88 with associated receiver 89 and intercoupling retrigger circuit 90 are likewise coupled to the transducer 77. As indicated by the broken lines $h_p$ and $h_r$ representing an assumed differential height of the manometer fluid in the respective manometer arms 71 and 72, the manometer is so operated for reasons presently to be explained, by application of a greater pressure to the arm 71, that whenever there is any differential height of the fluid columns in its arms the arm 71 will have the shorter of the two fluid columns. Thus the manometer arm 71 may receive through its input duct 74 a gas having an unknown pressure higher than the reference pressure (ordinarily atmospheric pressure), the manometer arm 72 receiving through its input duct 75 a gas of reference pressure against which the differential pressure measurement is made. Conversely, a gas having less than atmospheric pressure to be measured may be supplied to the manometer arm 72 and a gas of higher reference pressure is then supplied to the arm 71 for differential pressure measurement.

The present measurement system operates to provide successively repetitive measurement intervals at a rate established by a display rate multivibrator 94. The latter initiates each measurement interval by supplying a measurement initiation pulse of pulse duration $t_1-t_0$ to a reset pulse generator 95, a start pulse generator 96, and a blanking pulse generator 97. The reset pulse generator 95 supplies, at time $t_0$, a reset pulse which is used in conventional manner to reset to zero count value all counter stages of two five-stage binary counters 98 and 99. These counters are coupled to the amplified pulse output circuits of the respective receivers 86 and 89, and during system operation perform a count of the echo pulses received and amplified by each receiver to a total of 32 echo pulses. The blanking pulse generator 97 at time $t_0$ resets OFF a pair of control flip-flops 100 and 101 and, to guard against premature turn ON of these flip-flops by reason of possible transient circuit voltage fluctuations caused by the reset of the counters 98 and 99, maintains these flip-flops in their OFF state until the initiation of a measurement interval at time $t_1$. The blanking pulse generator 97 further controls a counter preset generator 105 which, beginning at time $t_0$, prepares a counter unit 106 to be later preset to a preselected count in a manner presently to be explained. The start pulse generator 96 initiates each measuring interval at time $t_1$ by supplying a start pulse concurrently to both of the drivers 85 and 88. The drivers respond to the start pulse by supplying concurrently to their associated transducers 76 and 77 supersonic electrical excitation pulses which cause the transducers to transmit supersonic measurement pulses to their respective liquid columns in the manometer arms. These supersonic measurement pulses are reflected by the interfaces between the top of the liquid columns and the gas in the manometer arms to produce echo pulses, and the latter are then received by the transducers 76 and 77 which convert the echo pulses to supersonic electrical echo pulses and supply them to the respective receivers 86 and 89. The latter amplify the echo pulses and apply them through their associated retrigger circuits 87 and 90 to their associated drivers 85 and 88 which cause retransmission of supersonic measurement pulses by their associated transducers 76 and 77.

The echo pulses received and amplified by the receiver 86 associated with the manometer arm 71, having the shorter liquid column, are supplied to and are counted by the counter 98. When the latter has counted a total of 32 echo pulses, the terminal stage of the counter turns the control flip-flop 100 ON at a time $t_2$. The latter thereupon generates at time $t_2$ an output pulse which is supplied through a control circuit 110 to the driver 85 to deenergize the latter and halt further retransmission of supersonic pulses by its associated transducer 76. The output pulse of the control flip-flop 100 is also supplied to a measure flip-flop 111 to turn the latter ON beginning at time $t_2$. The ON state of the measure flip-flop 111 causes a pulse at time $t_2$ to be applied through a circuit 112 to the counter preset generator 105 which thereupon at time $t_2$ operates to preset the counter 106 to a count of 9995, the reasons for the selection of this preset count value being more particularly considered hereinafter. The measure flip-flop 111 also supplies a pulse, beginning at time $t_2$, through a circuit 113 to enable an AND measure gate 114 which thereupon translates timing pulses from an oscillator 115 to the counter 106 to initiate a count of the timing pulses.

When the counter 99 has likewise counted a total of 32 echo pulses translated by the receiver 89 associated with the transducer 77 in the longer fluid column of the manometer, the terminal stage of the counter 99 at time $t_3$ turns the control flip-flop 101 ON. The ON state of the latter generates an output pulse at time $t_3$ which is supplied through a control circuit 118 to deenergize the driver 88 and halt further retransmission of supersonic pulses by the transducer 77. The output pulse produced at time $t_3$ by the control flip-flop 101 is also supplied to a one shot zero adjust multivibrator 119 which thereupon generates at time $t_4$, occurring a brief interval after time $t_3$, a pulse which is supplied to the measure flip-flop 111 to turn the latter OFF. The measure flip-flop 111 upon turning OFF at time $t_4$ disables the AND measure gate 114 to terminate the translation of further timing pulses from the oscillator 115 to the counter 106, thereby to halt the count operation of the latter. The count value of the counter at this time is a measure of the differential heights of the fluid columns in the manometer arms 71 and 72, and is displayed by a conventional visual count display indicator 120. The count digit value attained by the now halted counter 106 is now read out in binary-coded decimal digit value through conventional counter read out gates 122. To this end the latter are enabled by a read out one shot multivibrator 123 having a cycle of operation initiated at a time $t_5$ which is delayed by a short interval from the time $t_4$ by a delay unit 124 through which a turn OFF output pulse from the measure flip-flop 111 is supplied to the read out one shot multivibrator 123.

When the manometer 70 uses mercury as the manometer fluid, and when the counters 98 and 99 provide a total count of 32 echo pulses as described, operation of the oscillator 115 at a frequency of 87.5 kilocycles per second enables the differential heights of the manometer fluid columns to be measured by the counter 106 directly in inches of mercury to an accuracy of four places. Higher operational frequencies of the oscillator 115, se-lected in well known manner, and larger digit count capacities of the counts 98 and 99 enable the differential heights of the manometer fluid columns to be measured by the counter 106 in either millimeters of mercury or millibars of mercury.

The reason for presetting the counter 106 to an initial count value of 9995 at the initiation of each measuring interval and the function of the one shot zero adjust multivibrator 119 will now be considered. In practice, the transducers 76 and 77 are lapped to attain a wafer thickness providing a desired value of transducer supersonic resonant frequency. In the particular case where the transducers are fabricated of a ceramic material, the finished transducer wafer may not be finished to have optically flat face surfaces but rather might have slightly convex or slightly concave surfaces depending upon the particular lapping process employed. The seats which are provided at the lower ends of the manometer arms 71 and 72 to receive and vertically position the transducers are permitted in practice fabrication tolerances and this fact, together with the particular structure employed for positioning and retaining the transducers in their seats, may have the result that the transducers 76 and 77 may not be seated in the manometer with the transducer upper faces precisely in the same horizontal plane. The same result may be occasioned by the fact that the manometer is operationally supported with a slight tilt so that its arms 71 and 72 are not precisely vertically oriented. Further, the meniscus on the fluid in one manometer column may be slightly different from that of the other column. These various factors in the physical construction and operational conditions of the manometer become material when it is considered that the present system operates to measure differential fluid column heights to the order of $\frac{1}{1000}$ inch or better. They are all compensated, however, by presetting the counter 106 at the initiation of each measurement interval to a count value of 9995 and by use of the one shot zero adjust multivibrator 119. The initial preset count of the counter in effect electrically shortens the actual physical length of the fluid column in the manometer arm 71. Such will be evident when it is considered that the counter is not advanced to a zero count until it has received five initial timing pulses from the oscillator 115 after the AND measure gate 114 is enabled so that, for any given height of the fluid column in the manometer arm 72, the final count of the counter 106 is five counts less than it would have been had the counter been initially set to a zero count value. This, then, is equivalent to shortening the fluid column in the manometer arm 71. Since a supersonic measuring pulse must propagate from a transducer to the fluid interface and back to the transducer, thus corresponding to a propagation path length twice as long as the prevailing column height, the five initial timing pulses required to advance the counter to zero count value represent an effective shortening of the fluid column height in the manometer arm 71 to a value corresponding to 2½ timing pulses. The delay interval $t_4-t_3$ provided by the one shot zero multivibrator 119 is adjustable in each system installation from a zero delay value to some larger delay value. Bearing in mind that whatever value of delay selected is directly proportional to the number of timing pulses translated by the AND measure gate during the delay-extended time interval when it remains enabled, a zero value of delay corresponds to an effective electrical shortening of the physical length of the column in the manometer arm 72 corresponding to the five initial timing pulses required initially to advance the counter 106 to zero count value. A larger value of time delay represents an effective physical lengthening of the fluid column in the manometer arm 72 from its foreshortened value corresponding to the five initial timing pulses. With equalized gas pressures in the manometer arms to place the upper surfaces of the two fluid columns in the same nominal horizontal plane, the one shot zero adjust multivibrator 119 is adjusted to provide a time delay $t_4-t_3$ such that the counter 106 attains a zero count value during each of the successive measurement intervals. In this manner, compensation is effected for all of the foregoing discussed fabrication and operational differences prevailing in the two manometer arms so that the system is enabled to provide highly precise differential column height measurements.

The counter 106 and its associated visual count display unit 120 may have any of numerous conventional constructions, typical of which is a multidigit counter utilizing tandem digit groups of binary-count stages of the type shown as FIGURE 12–7 and described on pages 221–223 of Principles of Electronic Instruments by Partridge, published by Prentice-Hall, Inc. (copyright 1958).

While there have been described specific forms of the invention for purposes of illustration, it is contemplated that numerous changes may be made without departing from the spirit of the invention.

What is claimed is:

1. A system for measuring the difference between the travel times of supersonic energy along a first path and a second path shorter than the first path, comprising, first supersonic transducer means at one end of said first path for transmitting supersonic measurement pulses along said one path and receiving corresponding length-indicative supersonic echo pulses from the opposite end thereof, first energizing means coupled to said first transducer means for electrically energizing said first transducer means to transmit an initial supersonic measurement pulse and thereafter to retransmit a supersonic measurement pulse in response to reception of each of a succession of said corresponding echo pulses, second supersonic transducer means at one end of the second path for transmitting supersonic reference pulses along said second path and receiving corresponding echo reference pulses from the opposite end thereof, means including pulse counting means and second energizing means for electrically energizing said second supersonic transducer means to transmit along said second path an initial reference supersonic pulse in time coincidence with said initial measurement pulse along said first path and subsequent echo-retransmission reference supersonic pulses to provide under control of said counting means a length-reference time interval beginning with said initial pulse and terminating at a time corresponding to the receipt by said second transducer means of a preselected number of said supersonic echo pulses from said second path, measuring means controlled by said second energizing means for initiating a time measuring interval beginning at the termination of said length-reference time interval and including second counting means controlled by said first energizing means for terminating said time measuring interval in response to the receipt by said first transducer means from said first path of said preselected number of supersonic echo pulses after transmission of said initial measuring pulse, and display means responsive to said time measuring interval to display the value of said difference between said travel times.

2. A system for measuring the differential height of two bodies of a supersonic-energy-propagating fluid comprising, first supersonic transducer means for transmitting supersonic measurement pulses vertically into the fluid of the taller one of said bodies and for receiving corresponding height-indicative supersonic echo pulses therefrom, first energizing means coupled to said first transducer means for electrically energizing said first transducer means to transmit an initial supersonic measurement pulse and thereafter to retransmit a supersonic pulse in response to reception of each of a succession of said corresponding echo pulses, second energizing means including second supersonic transducer means for transmitting vertically into the fluid of the shorter one of said bodies an initial reference supersonic pulse in time coincidence with said initial measurement pulse and echo-retransmission reference supersonic pulses to provide a height-reference time interval beginning with said initial pulse and terminating at a time corresponding to the receipt by said second transducer means of a preselected number of said supersonic echo pulses in the fluid of said shorter body, measuring means controlled by said second energizing means for initiating a time measuring interval beginning at the termination of said height-reference time interval and controlled by said first energizing means for terminating said time measuring interval in response to the receipt by said first transducer means from the fluid of said taller body of said preselected number of supersonic echo pulses after transmission of said initial measuring pulse, and display means responsive to said time measuring interval to display the value of said differential height.

3. A system for measurng the differential height of two columns of a supersonic-energy-propagating liquid confined in the vertically oriented arms of a manometer comprising, a first liquid-confining manometer arm including a first supersonic transducer for transmitting supersonic measurement pulses vertically into the liquid of said first arm and for receiving corresponding height-indicative supersonic echo measurement pulses therefrom, first energizing means coupled to said first transducer means for electrically energizing said first transducer means to transmit an initial supersonic measurement pulse and thereafter to retransmit a supersonic measurement pulse in response to reception by said first transducer of each of a succession of said corresponding echo measurement pulses, a second liquid-confining manometer arm including a second supersonic transducer for transmitting supersonic reference pulses vertically into the liquid of said second arm and for receiving corresponding height-indicative supersonic reference echo pulses therefrom, second energizing means coupled to said second transducer for electrically energizing said second transducer to transmit an initial reference pulse coincident in time with said initial measurement pulse and thereafter to retransmit a supersonic reference pulse in response to reception by said second transducer of each of a succession of said corresponding reference echo pulses, means controlled by said second energizing means for providing a height-reference time interval beginning with said initial reference pulse and terminating at a time corresponding to the receipt by said second transducer of said supersonic reference echo pulses in the liquid of said second manometer arm, measuring means controlled by said second energizing means for initiating a time measuring interval beginning at the termination of said height-reference time interval and controlled by said first energizing means for terminating said time measuring interval in response to the receipt by said first transducer means from the liquid of said first arm of said preselected number of supersonic echo pulses after transmission of said initial measuring pulse, and display means responsive to said time measuring interval to display the value of said differential height.

4. A system for measuring the differential height of two columns of a supersonic-energy-propagating liquid confined in the vertically oriented arms of a manometer comprising, a first liquid-confining manometer arm including a first supersonic transducer for transmitting supersonic measurement pulses vertically into the liquid of said first arm and for receiving corresponding height-indicative supersonic echo measurement pulses therefrom, first energizing means coupled to said first transducer means for electrically energizing said first transducer means to transmit an initial supersonic measurement pulse and thereafter to retransmit a supersonic measurement pulse in response to reception by said first transducer of each of a succession of said corresponding echo measurement pulses, a second liquid-confining manometer arm including a second supersonic transducer for transmitting supersonic reference pulses vertically into the liquid of said second arm and for receiving corresponding height-indicative supersonic reference echo pulses therefrom, second energizing means coupled to said second transducer for electrically energizing said second transducer to transmit an initial reference pulse coincident in time with said initial measurement pulse and thereafter to retransmit a supersonic reference pulse in response to reception by said second transducer of each of a succession of said corresponding reference echo pulses, first counting means controlled by said second energizing means for counting the number of said transmittted supersonic reference pulses, second counting means controlled by said first energizing means for counting the number of said transmitted supersonic measurement pulses, measuring means controlled by each of said counting means for measuring the time interval between a preselected count value of each thereof, and display means responsive to said measured time interval for displaying the value of said differential height.

5. A system for measuring the differential height of two columns of a supersonic-energy-propagating liquid confined in the vertical oriented arms of a manometer comprising, a first liquid-confining manometer arm including a first supersonic transducer having a pulse translation surface for transmitting supersonic measurement pulses vertically into the liquid of said first arm and for receiving corresponding height-indicative supersonic echo measurement pulses therefrom, first energizing means coupled to said first transducer means for electrically energizing said first transducer means to transmit an initial supersonic measurement pulse and thereafter to retransmit a supersonic measurement pulse in response to reception by said first transducer of each of a succession of said corresponding echo measurement pulses, a second liquid-confining manometer arm including a second supersonic transducer having a pulse translation surface for transmitting supersonic reference pulses vertically into the liquid of said second arm and for receiving corresponding height-indicative supersonic reference echo pulses therefrom, second energizing means coupled to said second transducer for electrically energizing said second transducer to transmit an initial reference pulse coincident in time with said initial measurement pulse and thereafter to retransmit a supersonic reference pulse in response to reception by said second transducer of each of a succession of said corresponding reference echo pulses, means controlled by said second energizing means for providing a height-reference time interval beginning with said initial reference pulse and terminating at a time corresponding to the recept by said second transducer of a preselected number of said supersonic reference echo pulses in the liquid of said second manometer arm, means for providing electrical compensation for unequal effective relative displacements of said pulse translation surfaces of said transducers from a common horizontal plane, measuring means controlled by said second energizing means for initiating under control of said compensation means a time measuring interval beginning at the termination of said height-reference time interval and controlled by said first energizing means for terminating said time measuring interval under control of said compensation means in response to the receipt by said first transducer means from the liquid of said first arm of said preselected number of supersonic echo pulses after transmission of said initial measuring pulse, and display means responsive to said time measuring interval to display the value of said differential height.

6. A system according to claim 5 wherein said measuring means includes a source of measurement time indicia and a time indicia counter preset by said compensation means to provide a preselected value of time-indicia pre-count to establish a zero count value thereof, wherein said second energizing means at the termination of said height-reference interval initiates time indicia counting by said counter to initiate said time measuring interval, and wherein said first energizing means after receipt of said preselected number of supersonic echo pulses and after a preselected time delay provided by said compensation means halts the time indicia count by said counter to terminate said measuring interval.

7. Apparatus for comparing the travel times of supersonic energy waves along first and second propagation paths, respectively having longer and shorter travel times, comprising:
(a) means for transmitting a supersonic energy pulse from an initiating end to an echoing end and back to the initiating end of said first path;
(b) means effective upon return of a pulse to the initiating end to actuate the transmitting means to initiate a new pulse;
(c) pulse counting means controlling the transmitting means and the actuating means to stop the transmitting means after a predetermined multiplicity of pulses;
(d) time measuring means including:
 (1) time display means;
 (2) means for driving said time display means at a predetermined rate and in a direction to increase the time indication thereof as time increases;
(e) means for starting operation of the transmitting means and the pulse counting means;
(f) means for starting operation of the time measuring means after an interval following the starting of the pulse counting means having a duration controlled in accordance with the travel time of said predetermined multiplicity of pulses along the second of said two paths;
(g) means controlled by the arrival of the last pulse of said predetermined multiplicity at the initiating end of said one path for stopping said time measuring means;

wherein the improvement comprises:
(h) said means for starting said time measuring means, which comprises:
 (1) means for presetting said time display means at zero;
 (2) transmitting means, actuating means and pulse counting means for said second path;
 (3) means to initiate operation of both said transmitting means concurrently; and
 (4) means controlled by the arrival of the last pulse of said predetermined multiplicity at the initiating end of said second path for starting said time measuring means.

References Cited
UNITED STATES PATENTS
3,100,885   8/1963   Welkowitz et al. ___ 73—290 XR
3,115,615   12/1963   Saper.

DONALD O. WOODIEL, Primary Examiner

U.S. Cl. X.R.

73—32, 290

PO-1050
(5/69)

UNITED STATES PATENT OFFICE
CERTIFICATE OF CORRECTION

Patent No. 3,486,381               Dated December 30, 1969

Inventor(s) VITO C. FARESE

It is certified that error appears in the above-identified patent and that said Letters Patent are hereby corrected as shown below:

Col. 1, line 50, "easuring" should read -- measuring --.

Col. 2, line 30, "glass" should read -- gas --.

Col. 7, line 30, "containers" should read -- counters --.

Col. 8, line 13, "present" should read -- preset --.

Col. 12, line 54, after the word "prevailing" insert -- fluid --.

Col. 13, line 68 (claim 2), after "supersonic" insert

-- measurement --.

Col. 14, line 44, (claim 3), after "transducer" insert -- of a preselected number --.

Col. 15, line 48, (claim 5), "recept" should read

-- receipt --.

Signed and sealed this 7th day of July 1970.

(SEAL)
Attest:

EDWARD M. FLETCHER, JR.                WILLIAM E. SCHUYLER, JR.
Attesting Officer                      Commissioner of Patents